(12) United States Patent
König

(10) Patent No.: US 11,910,943 B2
(45) Date of Patent: Feb. 27, 2024

(54) MAT FOR REMOVABLY RECEIVING AN OBJECT

(71) Applicant: Marcus König, Graz (AT)

(72) Inventor: Marcus König, Graz (AT)

(*) Notice: Subject to any disclaimer, the term of this patent is extended or adjusted under 35 U.S.C. 154(b) by 420 days.

(21) Appl. No.: 16/468,362

(22) PCT Filed: Nov. 14, 2017

(86) PCT No.: PCT/AT2017/060302
§ 371 (c)(1),
(2) Date: Oct. 16, 2019

(87) PCT Pub. No.: WO2018/107190
PCT Pub. Date: Jun. 21, 2018

(65) Prior Publication Data
US 2020/0268185 A1    Aug. 27, 2020

(30) Foreign Application Priority Data
Dec. 12, 2016 (AT) ................ A 51126/2016

(51) Int. Cl.
| | |
|---|---|
| *A47G 19/10* | (2006.01) |
| *A47G 23/03* | (2006.01) |
| *A01K 1/035* | (2006.01) |
| *A01K 5/01* | (2006.01) |

(52) U.S. Cl.
CPC .......... *A47G 23/0303* (2013.01); *A01K 1/035* (2013.01); *A01K 5/0135* (2013.01); *A47G 19/10* (2013.01); *A47G 2400/08* (2013.01); *A47G 2400/12* (2013.01)

(58) Field of Classification Search
CPC ........................... A47G 19/10; A47G 23/0303
See application file for complete search history.

(56) References Cited

U.S. PATENT DOCUMENTS

| | | |
|---|---|---|
| 2,813,509 A | 11/1957 | Bruno |
| 6,318,683 B1 * | 11/2001 | Savoy ............... A47G 23/0225 403/348 |
| D583,111 S | 12/2008 | Mlina-Justin |
| 2007/0205205 A1 * | 9/2007 | Kliewer ............ A47G 23/0225 220/737 |

(Continued)

FOREIGN PATENT DOCUMENTS

| | | |
|---|---|---|
| CN | 2374102 | 4/2004 |
| CN | 103415231 | 11/2013 |

(Continued)

OTHER PUBLICATIONS

Int'l Search Report conducted in Int'l Appln. No. PCT/AT2017/060302 (dated Feb. 7, 2018).

(Continued)

*Primary Examiner* — William P Watkins, III
(74) *Attorney, Agent, or Firm* — GREENBLUM & BERNSTEIN, P.L.C.

(57) ABSTRACT

The invention relates to a mat (1), in particular a self-adhesive mat (1), which is at least partially formed from an elastically deformable material. According to the invention, the mat (1) comprises at least one recess (2), wherein in the recess (2) a receiving device (3) is positioned which is at least partially composed of a more solid material than the mat (1).

21 Claims, 3 Drawing Sheets

(56) References Cited

U.S. PATENT DOCUMENTS

| | | | |
|---|---|---|---|
| 2008/0216753 A1 | 9/2008 | Wang | |
| 2008/0245947 A1* | 10/2008 | Webb | A47G 19/10 |
| | | | 108/180 |
| 2011/0253054 A1 | 10/2011 | Hargrove | |
| 2012/0128922 A1* | 5/2012 | Bowen | A47G 23/0303 |
| | | | 428/80 |
| 2013/0119073 A1 | 5/2013 | Starkey-Johnson et al. | |
| 2015/0173465 A1 | 6/2015 | Messner et al. | |

FOREIGN PATENT DOCUMENTS

| | | |
|---|---|---|
| CN | 204292822 | 4/2015 |
| CN | 105595732 | 5/2016 |
| EP | 0 578 133 | 1/1994 |
| WO | 2016/010585 | 1/2016 |

OTHER PUBLICATIONS

Austria Office Action conducted in counterpart Austria Appln. No. 4A A 51126/2016 (dated Aug. 3, 2017) (w/ machine translation).
China Search Report/Office Action conducted in counterpart China Appln. No. 201780086125 (dated Apr. 3, 2020).

* cited by examiner

MAT FOR REMOVABLY RECEIVING AN OBJECT

The invention relates to a mat, in particular a self-adhesive mat, which is at least partially foil red from an elastically deformable material.

An elastic, in particular self-adhesive, mat is known from the prior art. When a self-adhesive mat known from the prior art lies flat on a smooth surface, for example, on a table, the mat adheres to the surface and can only be removed from the surface in that the mat is lifted at the edge.

WO2016/010585 A1 discloses a one-piece device composed of a self-adhesive mat and a tray arranged on the mat. This device primarily serves the purpose of making it possible for small children to eat independently without the tray thereby being overturned.

US 2008/0216753 A1 discloses a two-piece device composed of a footrest pad and a bowl that can be secured thereon. The bowl can be secured to the footrest pad by welding, screwing-on, gluing, etc.

U.S. Pat. No. 2,813,509 discloses a two-piece device composed of a mat and a bowl that can be secured on said mat. For the securing, it is provided that the bowl is inserted with a projection on an underside thereof into a lip on the mat.

The devices disclosed in US 2008/0216753 A1 and U.S. Pat. No. 2,813,509 are primarily used for the purpose of feeding pets.

One disadvantage of the described one-piece device composed of a self-adhering mat and a tray is the very inconvenient handling of the device caused by the elastic nature of the mat. A further disadvantage is a large space requirement caused by the size of the mat and the height of the tray, mainly during storage and cleaning.

The described two-piece variant from US 2008/0216753 A1 has the disadvantage that it becomes a one-piece embodiment after a fixed connection by means of welding or screwing-on, and that a separation of the two elements cannot be achieved in a non-destructive manner.

The two-piece variant described in U.S. Pat. No. 2,813,509 has the disadvantage that the two elements, namely the bowl and footrest pad, can detach from one another relatively easily when loaded too heavily, for example as the result of a dog pressing its snout laterally against the bowl, which is disadvantageous during use.

The object of the invention is to further develop a mat known from the prior art such that the space requirement, in particular during storage and cleaning, is minimized and, at the same time, a highly stable securing of an object is enabled.

According to the invention, the object is attained in that a mat of the type named at the outset comprises at least one recess, wherein in the recess a receiving device is positioned which is at least partially composed of a more solid material than the mat. A more solid material can be a material that has a higher Shore hardness than the mat itself. In particular, it can be provided that the receiving device exhibits a greater stiffness than the mat, whereby easy handling is ensured when connecting the object to the mat. Furthermore, the receiving device is embodied in particular to receive the object or part of the object, in particular an underside, such that the object then fastened is secured in an upwards direction.

One advantage achieved with the device according to the invention is in particular constituted by the ability of the mat and an object that can be secured thereon to be stored and cleaned separately from one another, whereby the space requirement of the device is minimized. Furthermore, a highly stable securing of an object is enabled, which securing can be quickly and easily released following use. The mat is in particular embodied to be self-adhesive, so that it can only be removed from the surface by lifting an edge of the mat. However, if an attempt is made to lift the mat in the middle, for example, by pulling on the object which is secured to the mat, the mat adheres firmly to the surface on which the mat is located. A self-adhesion of the mat can be achieved if the mat is embodied to be sufficiently smooth on the underside thereof, so that when an attempt is made to lift the mat in a position at a distance from the edge, a vacuum forms which resists a full-area detachment of the mat.

The recess can, but does not need to be, embodied as a complete opening in the mat. It is possible that the mat comprises a hole and the receiving device, but the receiving device can also be positioned in a depression in the mat. In the latter case, there is no hole-like opening.

It is preferably provided that the mat is at least partially formed from an elastic material, in particular from a food-grade material, for example from a silicone and/or a thermoplastic elastomer, so that a suitability for use with food is ensured and the mat is dishwasher-safe.

Furthermore, it can preferably be provided that an underside of the mat is embodied to be smooth, in order to ensure a self-adhesion of the mat on smooth surfaces. In addition, a structured underside of the mat can be provided in order to regulate the strength of the self-adhesion.

It is advantageous if the underside of the mat is embodied across the entire area, in order to maximize the adhesion of the mat on smooth surfaces. Alternatively, it can be provided that the underside of the mat is embodied in a structured manner and, for example, comprises a recessed surface on the underside and, for example, is embodied with indentations. The magnitude or strength of the self-adhesion can thus be set.

It is also possible that an outer edge on a top side of the mat is embodied in a raised manner. If the mat is used for feeding pets or for eating in general, the raised edge can serve as a barrier against dirt.

An outer edge of the mat can be embodied such that it is beveled towards an inner region of the mat and the underside of the mat in a surrounding manner or at least in sections. With an edge running at a downward slant from the edge in cross-section, the mat can be gripped well with one or more fingers at any desired position, and can be easily detached despite the adhesion of the mat. A slanted edge across large stretches of the course of the edge is preferred, preferably over the entire edge, so that there is no need to think about where to lift the mat. However, it is in principle also possible to provide only individual subsections of the edge with a corresponding slant or to provide individual recesses in the edge region which facilitate a removal of the mat from a subsurface.

It is preferably provided that the receiving device comprises a twist fastener with a lock, in order to ensure a simple and highly stable securing of an object to the mat. A bayonet fastener can be provided as a fastener that is particularly easy to handle and can be secured in a highly stable manner.

It is advantageous that the receiving device is at least partially formed from a thermoplastic, so that a stability of the twist fastener and a durability of the same are ensured.

To prevent an accumulation of dirt and bacteria, the receiving device can be positioned at an edge of the recess. It is particularly advantageous if the receiving device aligns with the mat without any gaps.

It is advantageous if the object, in particular a bowl or a tray, can be removably secured in the receiving device.

To enable a rapid securing of the object to or on the mat, it is advantageous if the object can be secured by a twisting in the receiving device.

According to the invention, the object is at least partially formed from a thermoplastic, so that a suitability for use with food is ensured and the object is dishwasher safe. A further advantage is constituted by the ability to produce the object cost-effectively from thermoplastic.

It is advantageous if the object comprises on an underside a connecting piece for the receiving device so that the object can be secured in the receiving device. This connecting piece can be a mating piece to a bayonet fastener in the mat, and can engage with the fastener in a positive and/or force fit.

To enable easy handling, it is provided according to the invention that the object comprises at least one handle.

To further improve the handling, it can be provided that the at least one handle is at least partially coated with silicone.

It is expedient if an intermediate layer is provided which is essentially embodied such that it can be arranged between the mat and the object. A surface area that is protected against soiling can thus be enlarged cost-effectively, since a large-area intermediate layer can be inserted and the mat itself does not need to be embodied in an enlarged manner. The intermediate layer can be inserted between the mat and the object and can thus be connected to the set. In this case, the intermediate layer can be embodied as a place mat or as a bib, for example. Through an interaction with the mat and the object, this intermediate layer can also possibly be secured therebetween in a positionally stable manner.

It is further advantageous if the intermediate layer comprises a hole through which a subregion of an object, in particular the connecting piece, can be guided. The object can thus be connected to the mat in the usual manner, wherein an edge of the hole surrounds the connecting piece and/or the receiving device. A connection of the object to the mat takes place through the hole in the intermediate layer. The intermediate layer is thus secured against slipping. To enable the connecting piece and/or the receiver to be guided through the hole, it is beneficial if a diameter of the hole in the intermediate layer is larger than the diameter of the connecting piece and/or the receiver. Furthermore, it is advantageous if the diameter of the hole is smaller than the maximum diameter of the object. It is thus prevented that the intermediate layer can be pulled upwards over the object and then be detached or separated from the set without first removing the object from the mat.

A further advantage results if the intermediate layer is embodied as a bib with an openable neck cutout. The intermediate layer can thus be firmly connected to the set on the one side and; for example, placed around the neck of a child on the other side. The neck cutout can in particular be embodied to be easy to open. For this purpose; two sides of the neck cutout can be closeable with a connection, such as for example a clip fastener, magnetic fastener, one or more snaps, or the like. In this case, it can be provided that small pulling forces already release this connection. It is particularly advantageous if the connection can be released with a pulling force of more than 100 N, preferably more than 75 N, particularly preferably with a pulling force of at least 25 N.

Figure 1:
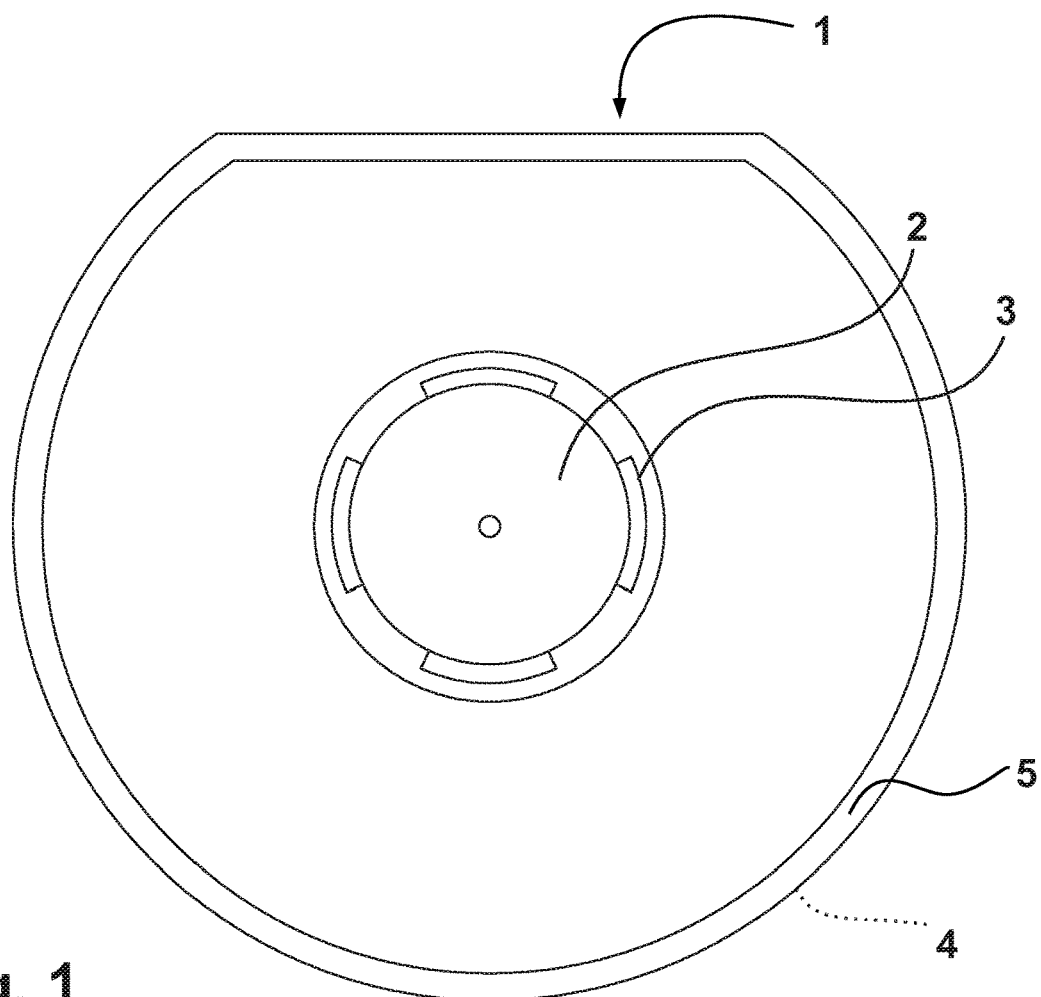
FIG. 1 shows a plan view of a mat according to the invention.

FIG. 1 shows a mat 1 in a plan view. The mat 1 is approximately round with one cut-off side, and is formed from an elastic material, in particular silicone. Alternatively, it can be provided that the mat 1 is formed from a thermoplastic elastomer in order to enable more cost-effective production. With the cut-off side; the mat 1 can be positioned flush with an edge or wall. In addition, two mats 1 can be lined up adjacent to one another on the cut-off side, for example. However, the mat 1 can also have any other desired shape and, for example, can be embodied to be rectangular. Furthermore, the mat 1 comprises in the center a circular recess 2. A receiving device 3, in particular a bayonet fastener, is positioned in the recess 2. Alternatively, any desired twist fastener, a thread, a hook-and-loop fastener, snap fastener or clip fastener, or a plug connection can be positioned in the recess 2. In addition, in place of a twist fastener, at least one magnet can be incorporated into the mat 1, which magnet enables a securing by means of an object-side, oppositely poled magnet or magnets. Optionally, a hook-and-loop fastener can also be provided as a receiving device 3.

The mat 1 is bounded by a raised outer edge 5. On this edge 5, a release handle can be provided which facilitates a removal of the mat 1 from the smooth surface. Furthermore, the mat 1 according to the invention comprises a smooth, full-area underside 4 not illustrated in FIG. 1

For an easy removal of the mat 1 from a subsurface, it can be provided that the outer edge 5 is beveled, that is, recessed from top to bottom, over the entire course thereof or at least in subsections. Because the outer edge 5 is embodied such that it is recessed from the outer edge 5 in cross-section, the mat 1 can be easily lifted.

Figure 2:
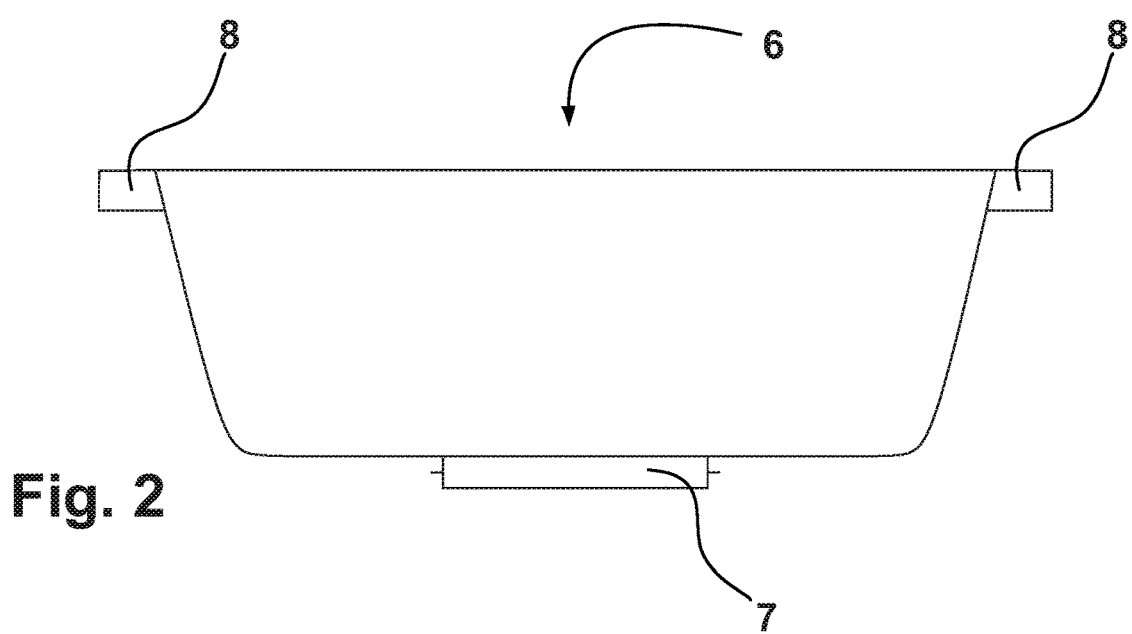
FIG. 2 shows a side view of a bowl.

FIG. 2 shows an object 6, in particular a bowl, in a side view. The object 6 comprises on an underside 4 a connecting piece 7 for the receiving device 3 not illustrated in FIG. 2. This connecting piece 7 can, for example, be the mating piece to a bayonet fastener, a thread, a hook-and-loop fastener, a plug connection, or a magnet oppositely poled from the magnet in the mat 1. Handles 8 on the side of the object 6 provide better handling of the object 6.

Figure 3:
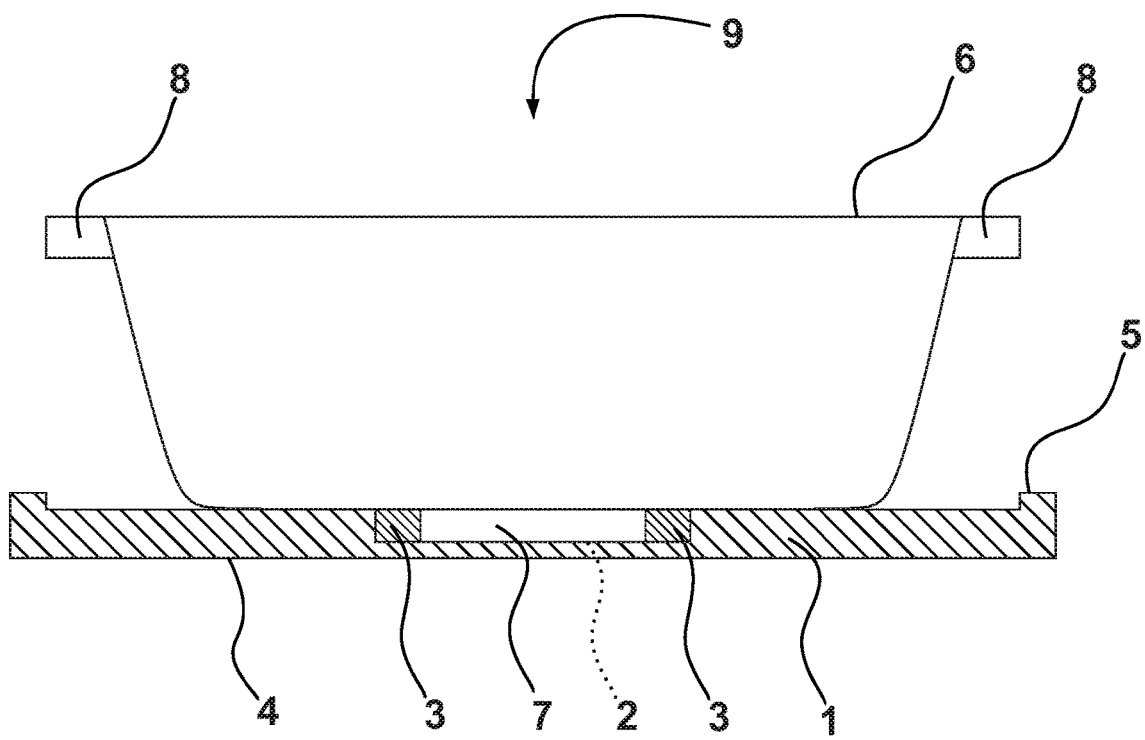
FIG. 3 shows a set of a mat and object in a partial cross-section illustration.

FIG. 3 shows a set 9 of the mat 1 and object 6. The object 6 is connected to the receiving device 3 by means of the connecting piece 7. One advantage, according to the invention, of the device is that an object 6 which is secured to a self-adhesive mat 1 can be neither moved nor overturned.

In addition, a separation into a mat 1 and an object 6 that can be secured thereon offers the possibility of combining the elements in a modular and purpose-oriented manner. Trays or bowls of a differing size and/or composition can thus be used. In addition, the field of use of the device is expanded due the modular embodiment of the device. For example, a holder for a mobile telephone and/or a navigation device can be secured in the receiving device 3 for self-adhesive installation on the dashboard of a vehicle.

In a method for producing a mat 1 according to the invention, a receiving device 3 fabricated from a thermoplastic is supplied and an elastic material, in particular silicone, is cast around the receiving device 3 in an injection molding process. A procedure of this type is expedient in order to ensure a most gap-free possible transition between the mat 1 and receiving device 3. An intimate, stable connection of the receiving device 3 to the surrounding silicone is thus also achieved.

Figure 4:
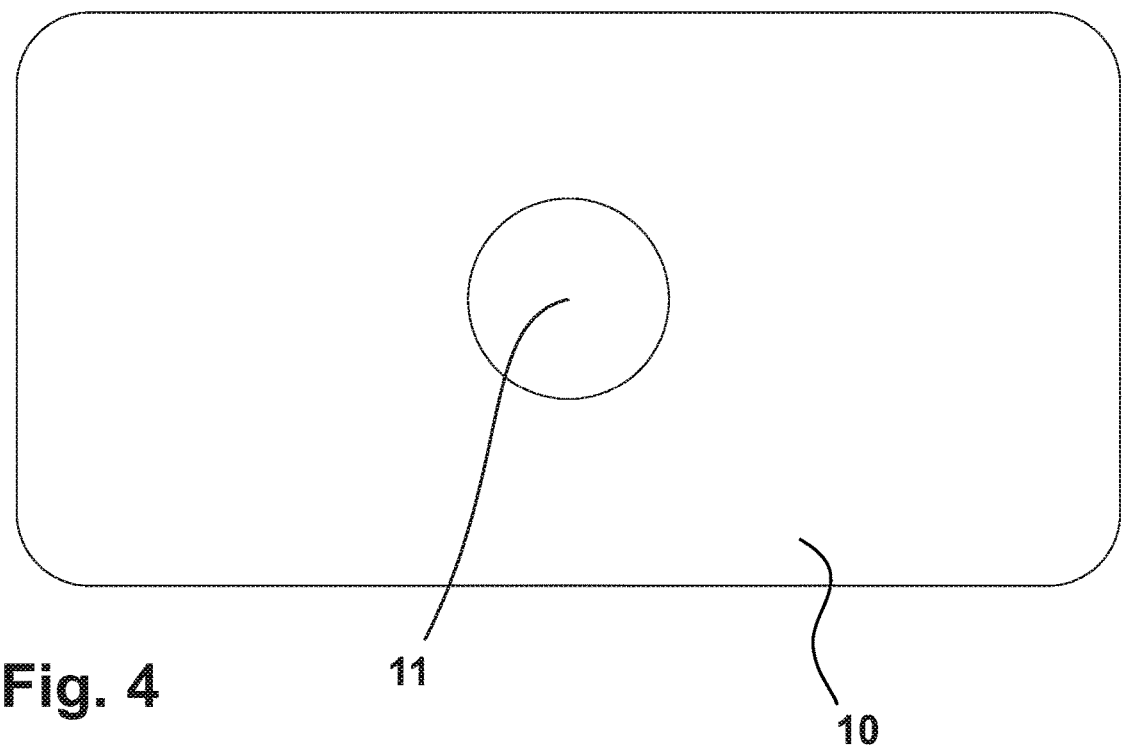
FIG. 4 shows a plan view of a place mat.

FIG. 4 shows a place mat 10 with a full-length hole 11. The hole 11 is in this case arranged in the middle of the place mat 10. In principle, however, the hole 11 can be positioned anywhere in the mat 1. With the set 9, the place mat 10 can be arranged as an intermediate layer between the mat 1 and the object 6, such as a tray, for example.

Figure 5:
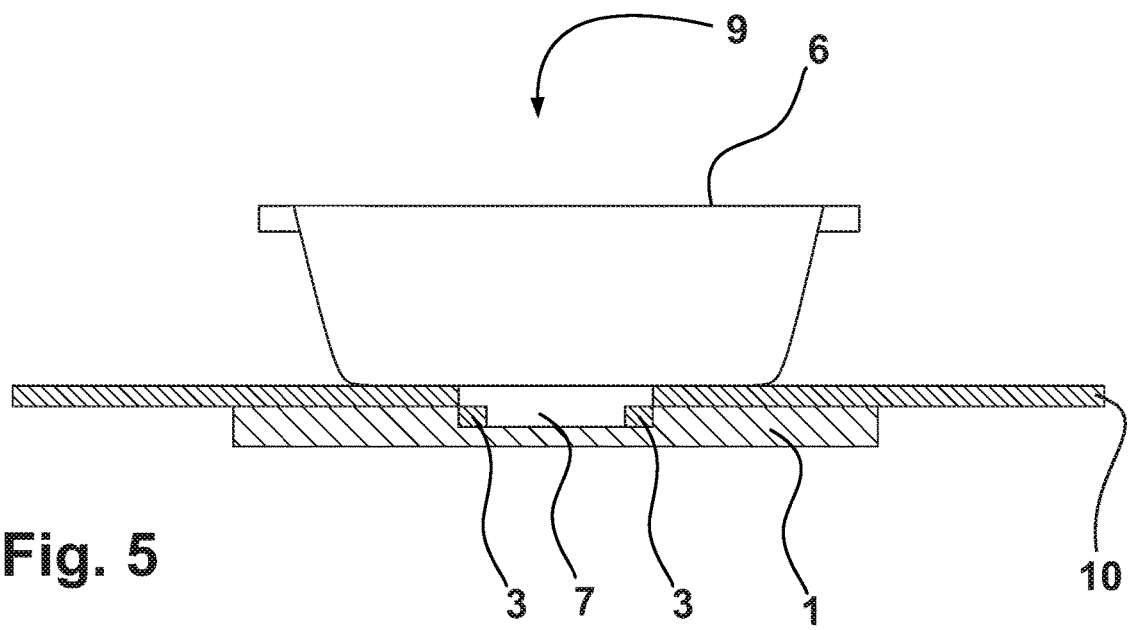
FIG. 5 shows a set of a mat and object and place mat in a partial cross-section illustration.

FIG. 5 shows a set 9 comprising a mat 1, an object 6, and an intermediate layer. The intermediate layer can in this case be embodied as a place mat 10. The object 6 is connected by means of a connecting piece 7 to the receiving device 3 and thus to the mat 1. For this purpose, the connecting piece 7 is guided through the hole 11 in the place mat 10. The place mat 10 or the intermediate layer can essentially be formed from a deformable or bendable and/or elastic material, or can comprise a material of this type.

Figure 6:
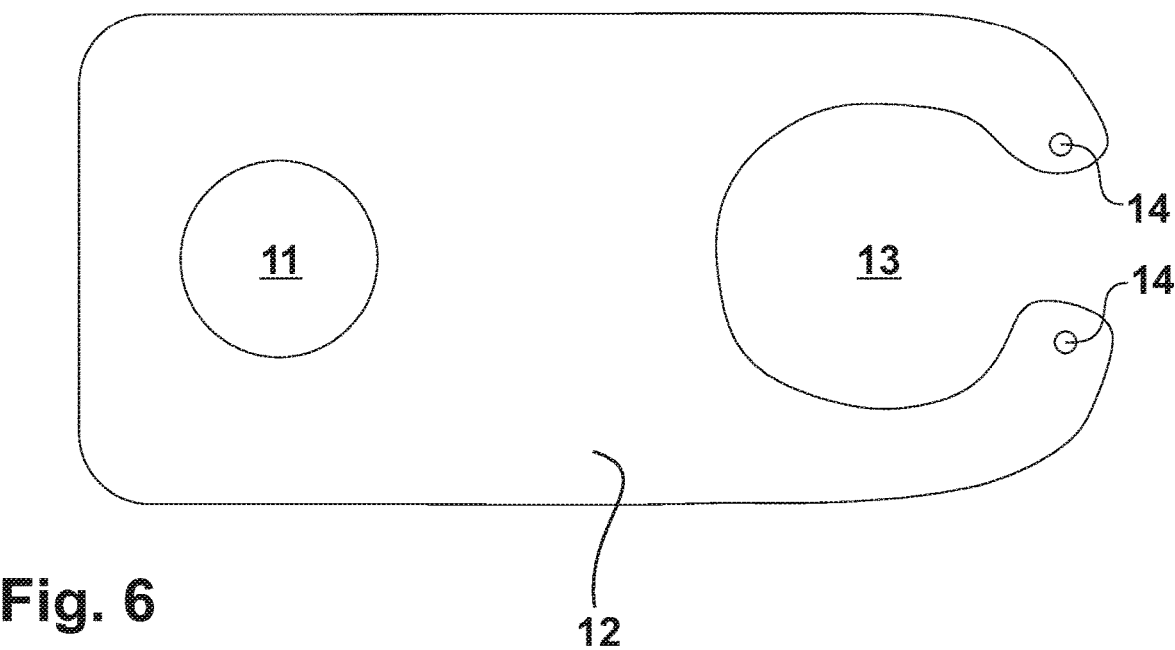
FIG. 6 shows a plan view of a bib.

The intermediate layer illustrated in FIG. 5 can alternatively be embodied as a bib 12. A bib 12 of this type, or a child's bib, is illustrated in a plan view in FIG. 6, wherein a place mat 10 has essentially been extended to form the bib 12. The bib 12 likewise comprises a hole 11 for securing to the set 9. At one end, the bib 12 additionally comprises an openable neck cutout 13 which can be closed by connecting elements, such as for example a snap connection 14, a clip fastener, magnets, or the like. The neck cutout 13 essentially comprises two arms which can be connected via the connecting elements. As an alternative to the neck cutout, two ribbons of fabric that can be tied around the neck can also be provided. Other variants for fastening around the neck of a small child are also possible.

A set 9 of this type can, for example, be used for feeding pets, since a tray can be secured to a floor with the self-adhesive mat 1, for example, and is thus secured against a displacement or overturning by a pet. If the pet nevertheless spills, the floor is protected by the mat 1.

In addition, a set 9 of this type can, for example, be used as a cereal or porridge dish for small children. In this case, a dish is secured to a table surface by the self-adhesive mat 1. It is thus possible for the small child to eat independently without the possibility of displacing or overturning the dish or dropping it on the ground. In order to cover the table surface across a larger area, the intermediate layer can be inserted between the mat 1 and the dish, for example. The place mat 10 can be provided for this purpose, for example. In order to additionally cover a region beyond the table edge, the advantages of a place mat 10 can, where a bib 12 according to the invention is used, also be utilized as those of a child's bib.

The invention claimed is:

1. A self-adhesive mat, which is at least partially formed from an elastically deformable material, the self-adhesive mat having an upper surface and an opposite underside and comprising:
    at least one recess formed in the upper surface of the mat; and
    a receiving device, which is contained within the recess, is located at or below the upper surface of the mat and at least partially composed of a material that is more solid material than the elastically deformable material, wherein the receiving device comprises a twist fastener with a lock.

2. The self-adhesive mat according to claim 1, wherein the elastic material comprises a food-grade material.

3. The self-adhesive mat according to claim 1, wherein the underside of the mat is embodied to be smooth.

4. The self-adhesive mat according to claim 3, wherein the underside of the mat is embodied across an entire area.

5. The self-adhesive mat according to claim 1, further comprising an outer edge on the upper surface of the mat embodied in a raised manner.

6. The self-adhesive mat according to claim 1, further comprising an outer edge of the mat that is beveled towards an inner region of the mat and in a direction towards the underside of the mat, wherein the outer edge surrounds the mat at least in sections.

7. The self-adhesive mat according to claim 1, wherein the receiving device is at least partially formed from a food-grade thermoplastic.

8. The self-adhesive mat according to claim 1, wherein the receiving device is positioned at an edge of the recess.

9. A set comprising:
    the self-adhesive mat according to claim 1; and
    an object that is removably secured in the receiving device.

10. The set according to claim 9, wherein the object can be secured in the receiving device by twisting.

11. The set according to claim 9, wherein the object is at least partially formed from a food-grade thermoplastic.

12. The set according to claim 9, herein the object comprises an underside and a connecting piece located on the underside for connection to the receiving device.

13. The set according to claim 9, wherein the object comprises at least one handle.

14. The set according to claim 9, wherein the at least one handle is at least partially coated with silicone.

15. The set according to claim 9, further comprising an intermediate layer arranged between the mat and the object.

16. The set according to claim 15, wherein the object comprises on an underside and a connecting piece located on the underside for connection to the receiving device and the intermediate layer comprises a hole through which the connecting piece is guided.

17. The set according to claim 15, wherein the intermediate layer is embodied as a bib with an openable neck cutout.

18. The self-adhesive mat according to claim 2, wherein the food-grade material comprises at least one of a silicone and a thermoplastic elastomer.

19. The according to claim 9, wherein the object comprises a bowl or a tray.

20. A mat, which is at least partially formed from an elastically deformable material, having an upper surface and an opposite underside and comprising:
    at least one recess formed in and below the upper surface;
    a receiving device, which is contained within the recess, is located at or below the upper surface of the mat and is at least partially composed of a material that is more solid material than the elastically deformable material,
    wherein the elastically deformable material is cast around the receiving device, and
    wherein the receiving device comprises a twist fastener with a lock.

21. A self-adhesive mat, which is at least partially formed from an elastically deformable material, having an upper surface and an opposite underside and comprising:
    at least one recess formed in and below the upper surface; and
    a receiving device, which is contained within the recess, is located at or below the upper surface of the mat and is at least partially composed of a material that is more solid material than the elastically deformable material, wherein the elastically deformable material is cast around the receiving device, wherein the mat is embodied across an entire area and the underside of the mat is smooth, and wherein the receiving device comprises a twist fastener with a lock.

\* \* \* \* \*